(12) United States Patent
Ritter et al.

(10) Patent No.: US 9,265,199 B2
(45) Date of Patent: Feb. 23, 2016

(54) SIDE HILL COMPENSATION FOR A HARVESTING HEAD

(71) Applicant: DEERE & COMPANY, Moline, IL (US)

(72) Inventors: Aaron S Ritter, Milan, IL (US); Bruce A Coers, Hillsdale, IL (US); Benjamin M Lovett, Colona, IL (US); Benjamin J Schlesser, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 23 days.

(21) Appl. No.: 14/086,444

(22) Filed: Nov. 21, 2013

(65) Prior Publication Data

US 2015/0135675 A1 May 21, 2015

(51) Int. Cl.
  *A01D 43/00* (2006.01)
  *A01D 57/20* (2006.01)
  *A01D 75/28* (2006.01)

(52) U.S. Cl.
  CPC .............. *A01D 57/20* (2013.01); *A01D 75/287* (2013.01)

(58) Field of Classification Search
  CPC ..... A01D 57/20; A01D 41/14; A01D 41/141; A01D 41/142; A01D 41/127; A01D 75/28; A01D 75/287
  USPC ......... 56/181, 153, 10.2 E, 10.2 R, 11.6, 14.5
  See application file for complete search history.

(56) References Cited

U.S. PATENT DOCUMENTS

| | | | | |
|---|---|---|---|---|
| 4,429,517 | A * | 2/1984 | Lohrentz et al. | 56/181 |
| 4,512,140 | A * | 4/1985 | Blakeslee | 56/11.6 |
| 4,519,190 | A * | 5/1985 | Blakeslee | 56/181 |
| 4,522,018 | A * | 6/1985 | Blakeslee | 56/181 |
| 4,938,010 | A * | 7/1990 | Guinn et al. | 56/181 |
| 5,791,128 | A * | 8/1998 | Rogalsky | 56/14.5 |
| 5,918,448 | A * | 7/1999 | Wheeler | 56/10.4 |
| 6,834,484 | B2 * | 12/2004 | Coers et al. | 56/10.2 R |
| 8,833,044 | B2 * | 9/2014 | Hoffman et al. | 56/10.6 |
| 2004/0200203 | A1 | 10/2004 | Dow et al. | |
| 2006/0213168 | A1 * | 9/2006 | Remillard et al. | 56/10.2 R |
| 2007/0119136 | A1 * | 5/2007 | MacGregor et al. | 56/10.2 H |
| 2010/0212276 | A1 * | 8/2010 | Digman | 56/10.2 E |
| 2011/0270494 | A1 * | 11/2011 | Imhof et al. | 701/50 |
| 2011/0302896 | A1 * | 12/2011 | Sauerwein et al. | 56/181 |
| 2012/0174549 | A1 * | 7/2012 | Schroeder et al. | 56/10.2 E |
| 2015/0033692 | A1 * | 2/2015 | Schroeder et al. | 56/10.2 E |

FOREIGN PATENT DOCUMENTS

| | | |
|---|---|---|
| EP | 2520156 A1 | 11/2012 |
| EP | 2769613 A1 | 8/2014 |

OTHER PUBLICATIONS

European Search Report issued in counterpart application No. 14190218.9, dated Apr. 23, 2015 (7 pages).

* cited by examiner

*Primary Examiner* — Árpád Fábián-Kovács

(57) ABSTRACT

A control system (210) is provided for an agricultural harvester (200), the agricultural harvester (200) having an agricultural harvesting vehicle (202) and a harvesting head (204) mounted thereon, the harvesting head (204) further comprising a left side endless belt conveyor (214) driven by a left conveyor motor (312), a right side endless belt conveyor (218) driven by a right conveyor motor (310) and a center endless belt conveyor (220) driven by a center conveyor motor (314), the control system (210) comprising an electronic controller (300) configured to receive an electronic signal indicative of a roll angle of the harvesting head (204), and to electronically change a relative speed of at least one of the right conveyor motor (310) and the left conveyor motor (312) based at least upon the electronic signal indicative of a roll angle of the harvesting head (204).

10 Claims, 5 Drawing Sheets

SIDE HILL COMPENSATION FOR A HARVESTING HEAD

FIELD OF THE INVENTION

This invention relates to harvesting heads for agricultural harvesters. In particular, it relates side hill compensation for harvesting heads. More particularly it relates to the control of conveyor belt speed based upon the orientation of a harvesting head.

BACKGROUND OF THE INVENTION

Harvesting heads for agricultural harvesters employ a left side endless belt conveyor that conveys crop material from the left side of the harvesting head toward the center of the harvesting head and a right side endless belt conveyor that conveys crop material from the right side of the harvesting head toward the center of the harvesting head. These belts typically convey material at the same speed.

As shown in FIG. 1, when the harvesting head 100 is traveling on the side of a hill harvesting crop, one end of the harvesting head is lower than the other.

One of the conveyors 102 lifts cut crop material as it carries it upward and toward the center of the harvesting head. The other of the conveyors 104 lowers cut crop material as it carries it downward and toward the center of the harvesting head.

Even though the two conveyors 102, 104 are operating at the same speed (indicated by the velocity arrows in FIG. 1), the cut crop material is deposited off-center on a center conveyor 106.

This off-center deposition can cause the center conveyor 106 to feed poorly. This, in turn, can cause misfeeding of crop material and blockages. When this occurs, the operator must stop the agricultural harvester, climb down from the operator station, manually remove the misfed material, and then returned to the operator station to continue harvesting. This process of clearing the harvesting head is time-consuming.

What is needed, therefore, is a system that monitors the roll angle of the agricultural harvester and automatically reduces or eliminates the off-center deposition of cut crop material on the center conveyor 106.

It is an object of this invention to provide such a system.

SUMMARY OF THE INVENTION

In accordance with a first aspect of the invention, a control system is provided for an agricultural harvester having an agricultural harvesting vehicle and a harvesting head mounted thereon, the harvesting head further comprising a left side endless belt conveyor driven by a left conveyor motor, a right side endless belt conveyor driven by a right conveyor motor and a center endless belt conveyor driven by a center conveyor motor, the control system comprising: an electronic controller configured to receive an electronic signal indicative of a roll angle of the harvesting head, and to electronically change a relative speed of at least one of the right conveyor motor and the left conveyor motor based at least upon the electronic signal indicative of a roll angle of the harvesting head.

The control system may further comprise a means for sensing the roll angle of the harvesting head, and further wherein the means for sensing is coupled to the electronic controller to provide the electronic controller with the electronic signal indicative of a roll angle of the harvesting head.

The control system may further comprise an operator input device coupled to the electronic controller, wherein the operator input device is configured to provide the electronic controller with an electronic signal indicative of an operator-commanded conveyor speed, and further wherein the electronic controller is configured to generate a conveyor speed signal based upon a combination of the operator-commanded conveyor speed and the electronic signal indicative of a roll angle of the harvesting head.

The control system may further comprise a means for controlling a speed of the right conveyor motor and a speed of the left conveyor motor, wherein the means for controlling is configured to receive at least one conveyor speed command from the electronic controller and to periodically and automatically modify the at least one conveyor speed command in accordance with the electronic signal indicative of a roll angle of the harvesting head.

The means for sensing may comprise at least one member selected from a group consisting of a pendulum sensor, an accelerometer, and a satellite navigation receiver.

The means for controlling may comprise at least one member selected from a group consisting of a hydraulic flow control valve and an electric motor driver circuit.

The electronic controller may be configured to electronically change the relative speed of at least one of the right conveyor motor and the left conveyor motor in response to an increasing roll angle of the harvesting head by (A) decreasing a speed of an uphill conveyor, (B) increasing a speed of a downhill conveyor, or (C) both decreasing the speed of the uphill conveyor and increasing the speed of the downhill conveyor.

The means for sensing may be mounted on the harvesting head.

The agricultural harvester may comprise an agricultural harvesting vehicle which supports the harvesting head for movement through a field harvesting crops, and the means for sensing may be mounted on an agricultural harvesting vehicle.

In accordance with another aspect of the invention, an agricultural harvester is provided comprising an agricultural harvesting vehicle; a harvesting head mounted on the agricultural harvesting vehicle; and a control system; wherein the harvesting head further comprises a left side endless belt conveyor drivingly coupled to a left conveyor motor, a right side endless belt conveyor drivingly coupled to a right conveyor motor and a center endless belt conveyor drivingly coupled to a center conveyor motor; and wherein the control system further comprises an electronic controller configured to receive an electronic signal indicative of a roll angle of the harvesting head, and to electronically change a relative speed of at least one of the right conveyor motor and the left conveyor motor based at least upon the electronic signal indicative of a roll angle of the harvesting head.

DETAILED DESCRIPTION OF THE PREFERRED EMBODIMENTS

Figure 2:
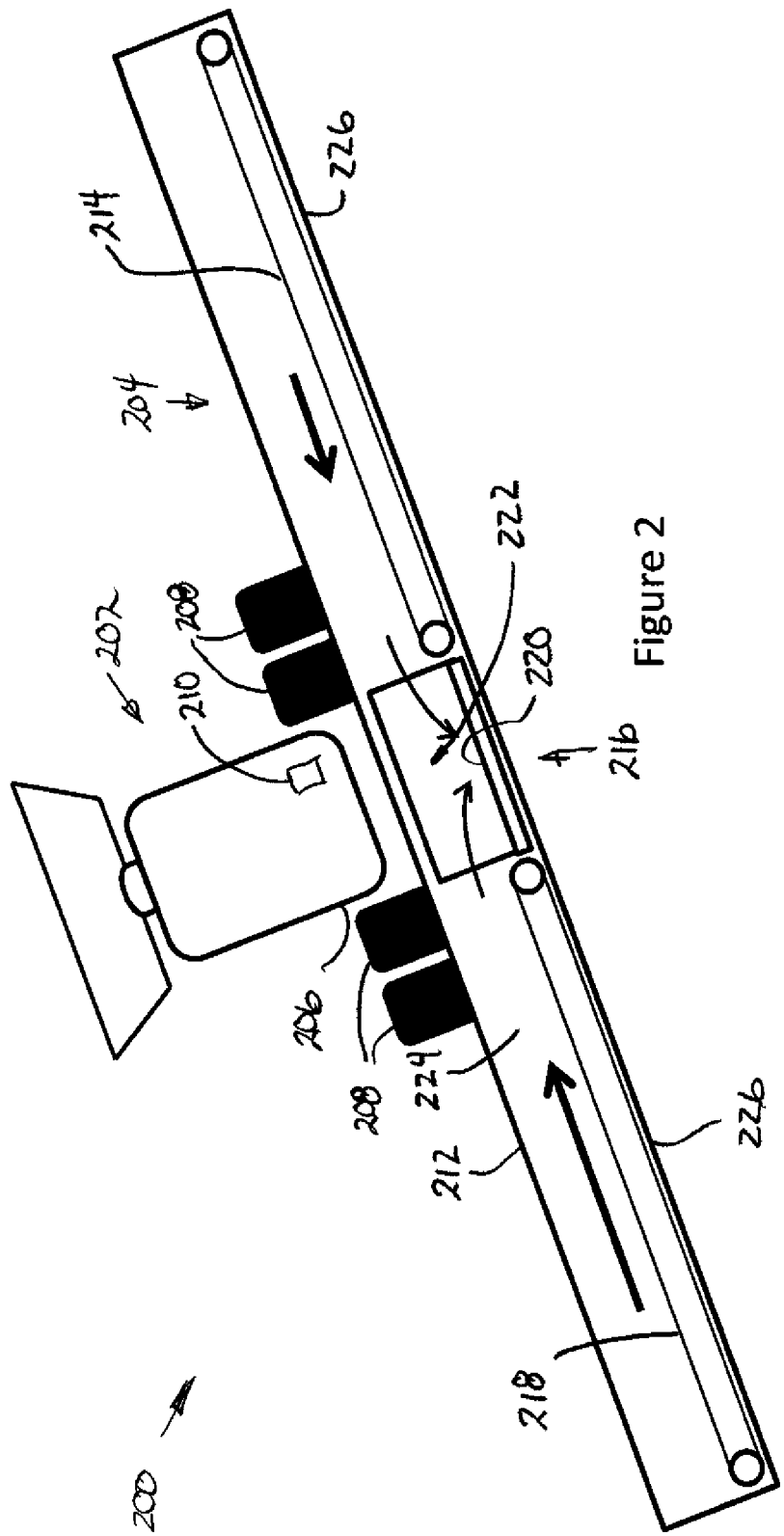
FIG. 2 is a front view of an agricultural harvester in accordance with the present invention operating on the side of a hill.

Referring to FIG. 2, an agricultural harvester 200 includes an agricultural harvesting vehicle 202 and a harvesting head 204. The harvesting head 204 is supported on the front of the agricultural harvesting vehicle 202 and is carried by the agricultural harvesting vehicle 202 through the field to harvest crops.

The agricultural harvesting vehicle 202 comprises a chassis 206 that is supported on wheels 208. The agricultural harvesting vehicle 202 further comprises a control system 210.

The harvesting head 204 comprises an elongate laterally extending frame 212 that extends generally perpendicular to the direction of travel of the agricultural harvester 200 as it travels through the field harvesting crops.

The harvesting head 204 further comprises a left side endless belt conveyor 214 that conveys cut crop material to the right and laterally inward towards a central region 216 of the harvesting head 204.

The harvesting head 204 further comprises a right side endless belt conveyor 218 that conveys cut crop material to the left and laterally inward toward the central region 216 of the harvesting head 204.

The harvesting head 204 further comprises a center endless belt conveyor 220 that conveys cut crop material rearward and through an aperture 222 in a rear wall 224 of the harvesting head 204.

The harvesting head 204 further comprises an elongate reciprocating knife 226 is disposed along a leading edge of the harvesting head 204 to sever the stalks of standing crop plants close to the ground. The elongate reciprocating knife 226 extends across substantially the entire length of the harvesting head 204.

The left side endless belt conveyor 214 and the right side endless belt conveyor 218 are disposed such that cut crop material severed by the elongate reciprocating knife 226 falls onto the upper surface of the conveyors and is carried toward the central region 216 of the harvesting head 204 is indicated by the arrow superimposed on top of the left side endless belt conveyor 214 and the right side endless belt conveyor 218 in FIG. 2.

The cut crop material carried by these two conveyors is dropped onto the upper surface of the center endless belt conveyor 220. The center endless belt conveyor 220 then carries the cut crop material rearward and through the aperture 222.

Each of the three conveyors has at least one corresponding motor (FIG. 3) that drives that conveyor. The control system 210 is configured to individually and independently control the speeds of these motors.

Figure 3:
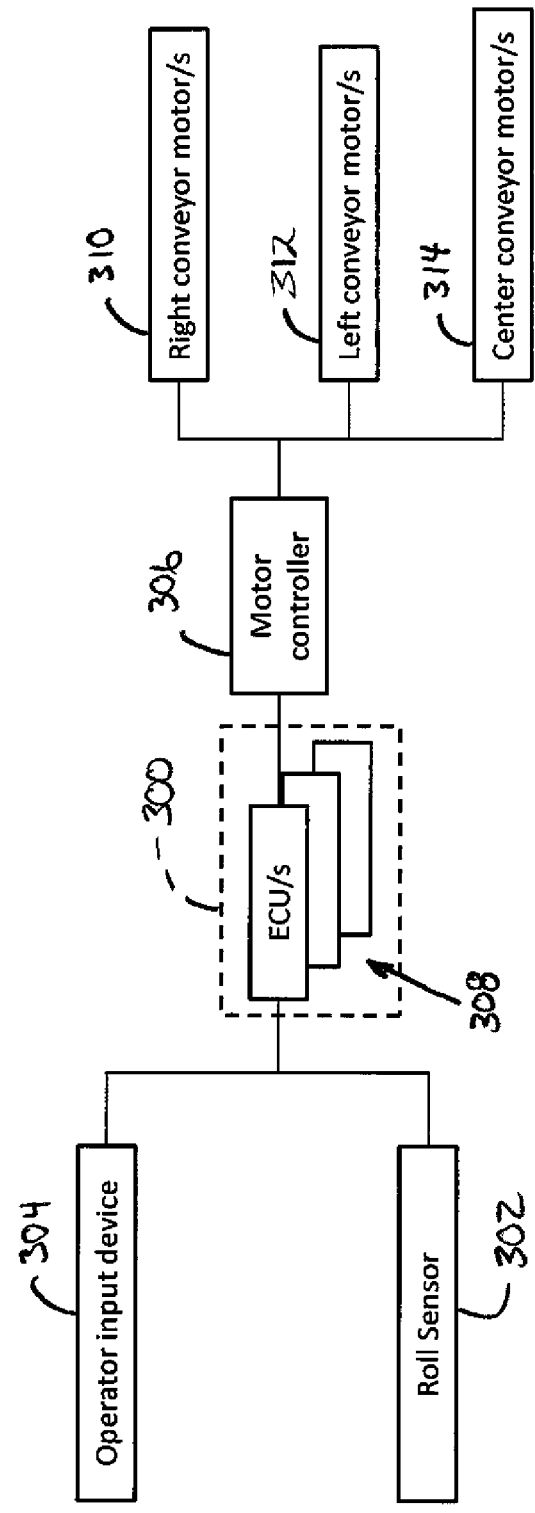
FIG. 3 is a schematic diagram of a control system for controlling the speed of the conveyors of the harvesting head of FIG. 2.

In FIG. 3, the control system 210 comprises an electronic controller 300, a roll sensor 302, an operator input device 304, and a motor controller 306.

The electronic controller 300 comprises one or more electronic control units (ECUs) 308. Each ECU 308 is connected to the other ECUs 308 to collectively form a network. The network can be wired or wireless.

Each ECU 308 can be coupled to one or more of the roll sensor 302, the operator input device 304, and the motor controller 306. Each ECU 308 (if there is more than one) is configured to communicate with the other ECUs 308 over the network to provide data to the other ECUs 308 to thereby permit them to collectively perform the functions that are described herein.

Each ECU 308 comprises an ALU (arithmetic logic unit) and a digital memory circuit. The digital memory circuits is configured to store instructions executed by the ALU as well as working variables calculated by the ALU as it performs the functions described herein.

The roll sensor 302 is configured to generate a signal indicative of a roll angle of the harvesting head 204. The roll sensor 302 may comprise simple gravitational sensor such as a pendulum sensor responsive to the gravitational pull of the earth. Alternatively the roll sensor 302 may comprise a single or multi-axis accelerometer.

Alternatively the roll sensor 302 may comprise a location sensor (such as a satellite or ground-based navigation receiver) that indicates a position of the harvesting head 204 in the field being harvested, and an electronic map containing data indicating the slope of the field (and thus the roll angle of the harvesting head 204) at various positions in the field being harvested. In this arrangement, the roll sensor 302 is configured to use the position and/or direction of travel of the harvesting head 204 to reference the electronic map and thereby to determine roll angle of the harvesting head 204.

In another arrangement, the agricultural harvester 200 may be configured to determine a position of the harvesting head 204 in the field and to transmit that data wirelessly to a remote digital computer. The remote digital computer can be configured to calculate the roll angle of the harvesting head 204 based upon the position data and an electronic map, and to wirelessly transmit data indicative of the roll angle back to the agricultural harvester 200. In this arrangement, the roll sensor 302 comprises a radio transmitter/receiver on the agricultural harvester 200 that is configured to transmit a position of the harvesting head 204 and receive back the data indicative of the roll angle.

In some harvesting arrangements, the harvesting head 204 is configured to pivot (i.e. roll) with respect to the agricultural harvesting vehicle 202, thereby maintaining the agricultural harvesting vehicle 202 horizontal even when the harvesting head 204 is pivoted in order to follow the contours of the field. The roll sensor 302 may therefore be mounted on the harvesting head 204.

The operator input device 304 is comprised of one or more switches, touch screens, keyboards, potentiometers, variable resistors, voice-recognition systems, or the like that are configured to receive an operator command either manually or by voice and to translate that command into an electrical or optical signal indicative of the operator command.

In one arrangement, the operator input device 304 comprises a touchscreen display in which instructions are generated on a screen of the touchscreen display by the operator input device 304, and the operator touches the display at the locations indicated on the screen to indicate the operator command.

The motor controller 306 is comprised of one or more hydraulic flow control valves or electric motor driver circuits that are configured to generate driving signals (e.g. a signal indicative of a flow of hydraulic fluid or flow of electricity) that are applied to a right side conveyor motor (or motors) 310 that is coupled to and drives the left side endless belt conveyor 214, a left side conveyor motor (or motors) 312 that is coupled to and drives the right side endless belt conveyor 218, and a motor that is coupled to and drives the center endless belt conveyor 220.

Figure 4:
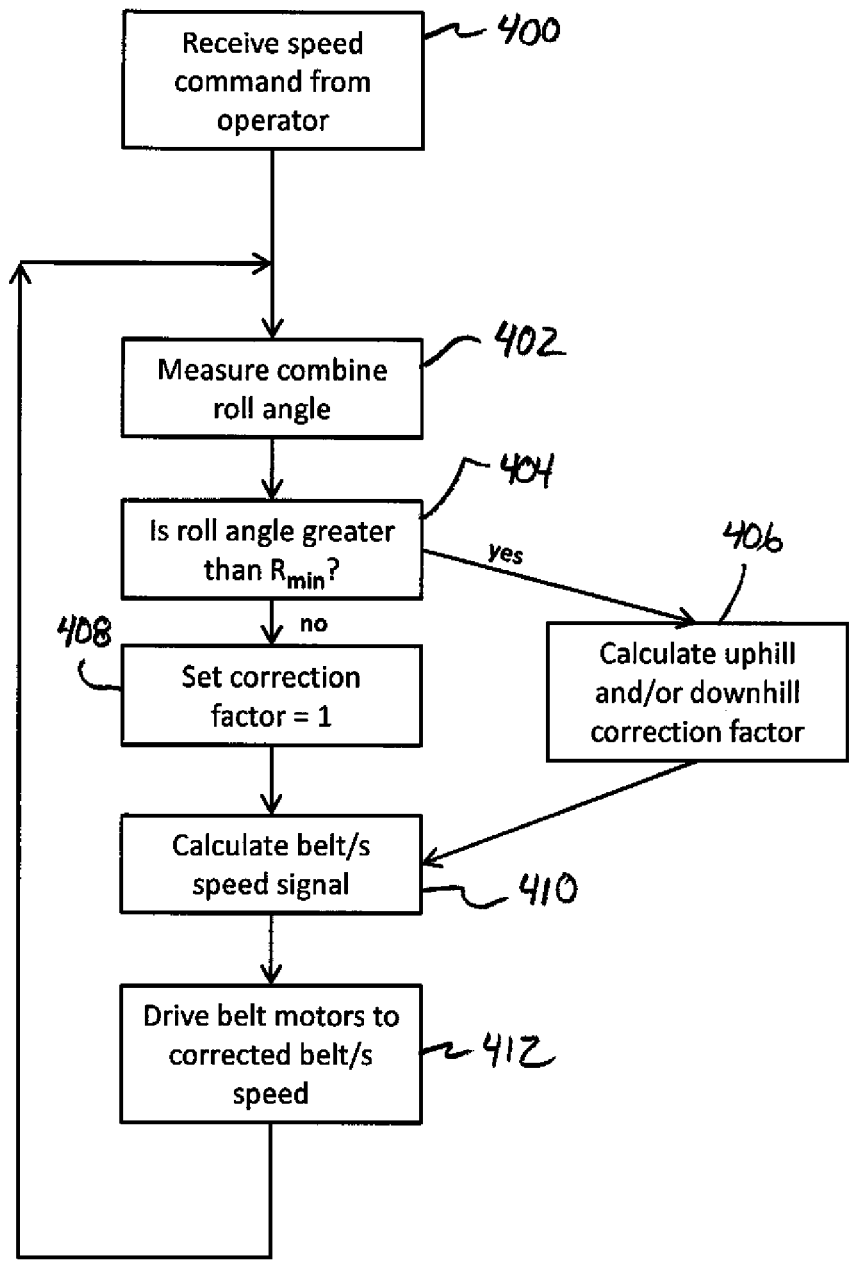
FIG. 4 is a flowchart of the operations performed by the control system of FIG. 3.

FIG. 4 illustrates the steps performed by the control system 210 as it regulates the speed of the conveyors in accordance with the present invention.

In step 400, the electronic controller 300 receives a signal indicative of a speed command entered by the operator using the operator input device 304. After performing step 400, the electronic controller 300 then performs step 402.

In step 402, the electronic controller 300 determines the combine roll angle by reading the signal provided by the roll sensor 302. After performing step 402, the electronic controller 300 then performs step 404.

In step 404, the electronic controller 300 compares the combine roll angle indicated by the roll sensor 302 with a minimum roll angle ($R_{min}$), and if the combine roll angle is greater than the minimum roll angle, the electronic controller 300 proceeds to execute step 406. If the combine roll angle is not greater than the minimum roll angle, the electronic controller 300 proceeds to execute step 408.

In step 406, the electronic controller 300 calculates an uphill, a downhill, or an uphill and a downhill speed correction factor. The calculation of the correction factor (or factors) is discussed in more detail in conjunction with FIG. 5 below. After performing step 406, the electronic controller 300 then performs step 410.

In step 408, the electronic controller 300 sets the correction factor equal to 1. After executing step 408, the electronic controller 300 proceeds to execute step 410.

In step 410, the electronic controller 300 calculates a speed signal for one or both belts based upon the correction factor or factors established in step 408 (or alternatively in step 406). After performing step 410, the electronic controller 300 then performs step 412.

In step 412, the electronic controller 300 communicates the speed signal to the motor controller 306, which in turn generates corresponding drive signals (either hydraulic or electrical) and applies them to the right conveyor motor/s 310, the left conveyor motor/s 312, and the center conveyor motor/s 314. The right conveyor motor or motors 310 may be a hydraulic motor or an electric motor. The left conveyor motor or motors 312 may be a hydraulic motor or an electric motor. The center conveyor motor or motors 314 may be a hydraulic motor or an electric motor.

Having executed step 412, the electronic controller 300 automatically returns to step 400 and again receives a speed command from the operator, repeating the process.

The electronic controller 300 is configured to execute the steps 400-412 continuously and repeatedly as the agricultural harvester 200 travels through the field harvesting crops.

Figure 5:
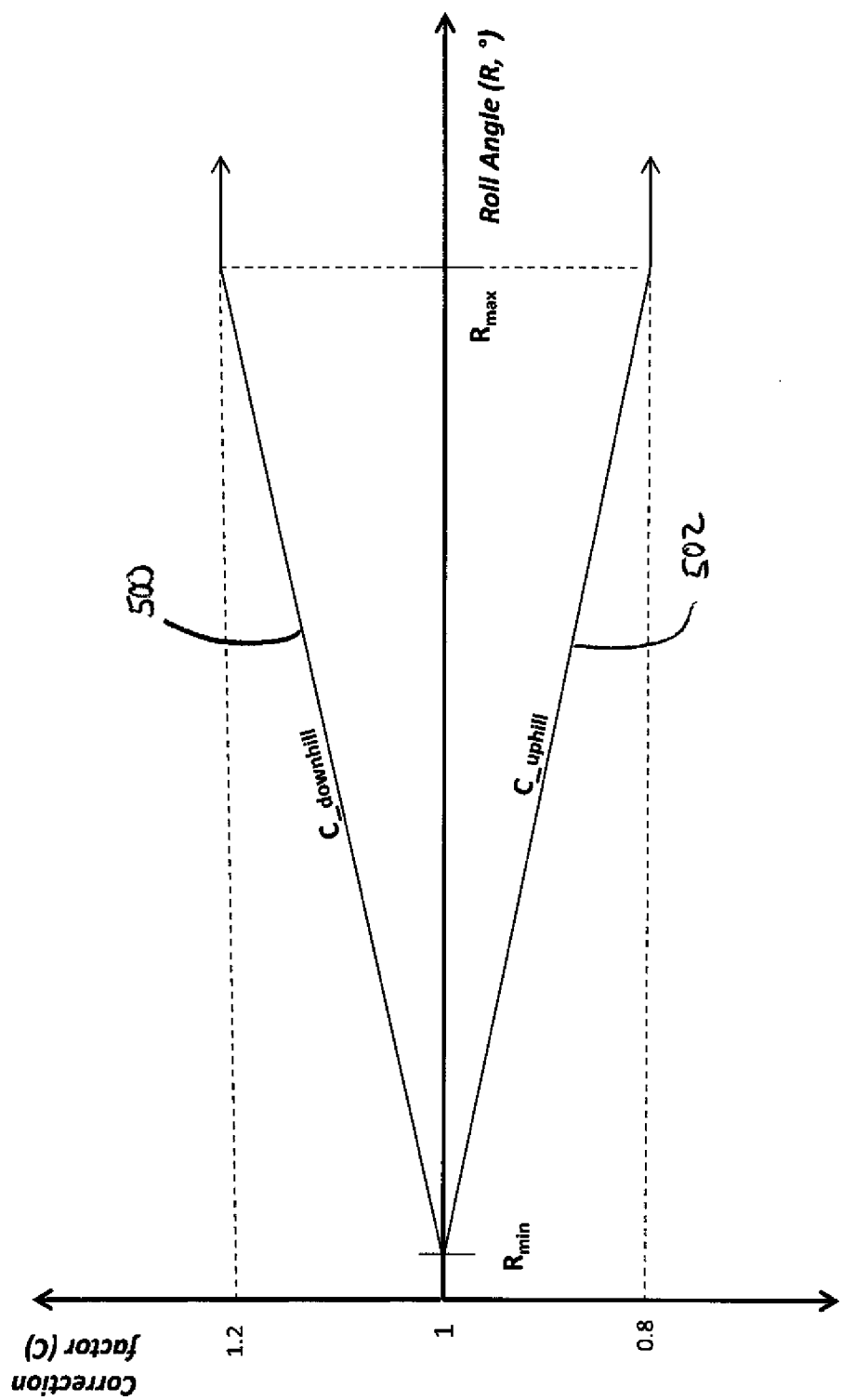
FIG. 5 is a chart showing the relationship between the roll angle of the agricultural harvesting head and correction factor applied by the system to provide a greater speed for the conveyor on the downhill side with respect to the speed of the conveyor on the uphill side.

FIG. 5 is a graph of the correction factors produced by the electronic controller 300. There are two correction factors: C_downhill 500 and C_uphill 502.

C_downhill is a correction factor used to modify the speed of the downhill conveyor. The downhill conveyor is the conveyor that is lower when the agricultural harvester 200 is operating on a slope, for example as shown in FIG. 2. In FIG. 2 the downhill conveyor is the right side endless belt conveyor 218, which is lower than the left side endless belt conveyor 214. The downhill conveyor carries cut crop material at an upward angle and then deposits it on the center endless belt conveyor 220.

Whether the left side endless belt conveyor 214 or the right side endless belt conveyor 218 is the "downhill conveyor" depends upon the roll angle of the agricultural harvester 200.

C_uphill is a correction factor used to modify the speed of the uphill conveyor. The uphill conveyor is the conveyor that is higher when the agricultural harvester 200 is operating on a slope, for example as shown in FIG. 2. In FIG. 2 the uphill conveyor is the left side endless belt conveyor 214, which is higher than the right side endless belt conveyor 218. The uphill conveyor carries cut crop material at a downward angle and then deposits it on the center endless belt conveyor 220.

Whether the left side endless belt conveyor 214 or the right side endless belt conveyor 218 is the "uphill conveyor" depends upon the roll angle of the agricultural harvester 200.

Figure 1:
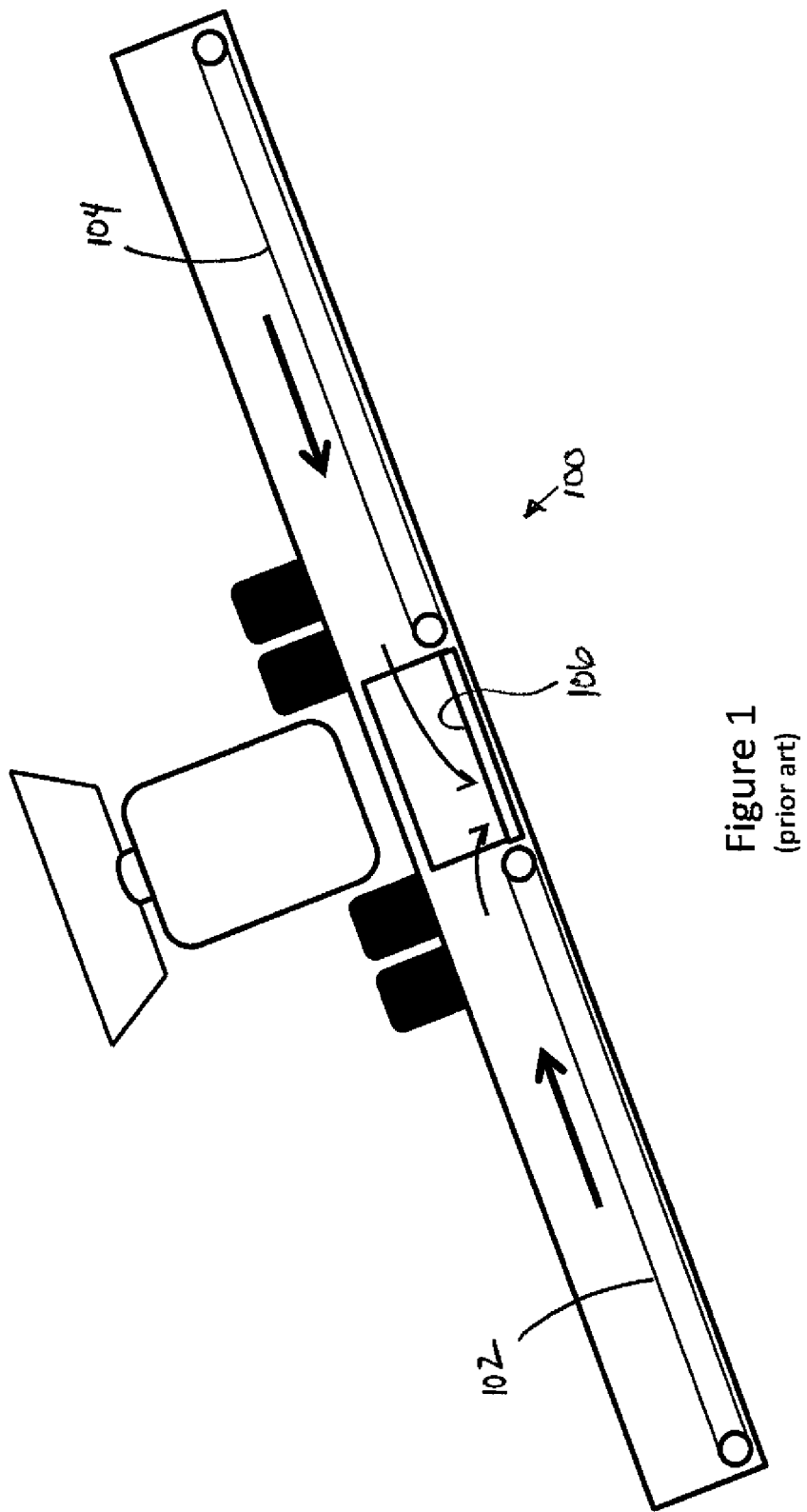
FIG. 1 is a front view of a prior art agricultural harvester operating on the side of a hill.

In the prior art (see e.g. FIG. 1), both the uphill conveyor 104 and the downhill conveyor 102 operate at the same speed (e.g. the linear speed of the upper surface of the conveyor belt of the conveyor) carrying crop inwardly to the center endless belt conveyor 106 at the same lateral speed. As discussed above with regard to FIG. 1, this causes cut crop material on the downhill conveyor to be deposited on the downhill side of the center endless belt conveyor 220. This also causes cut crop material on the uphill conveyor to be deposited on the downhill side of the center endless belt conveyor 220.

To prevent this, the electronic controller 300 changes the relative speeds of the uphill and the downhill conveyor. In particular, the electronic controller 300 automatically adjusts the speed of the uphill conveyor and/or the downhill conveyor based upon the roll angle of the agricultural harvester 200 (more specifically, based upon the roll angle of the harvesting head 204).

In one arrangement, the electronic controller 300 both increases the speed of the downhill conveyor and decreases the speed of the uphill conveyor as the roll angle increases.

In another arrangement, the electronic controller 300 does not increase the speed of the downhill conveyor as the roll angle increases, but instead decreases the speed of the uphill conveyor.

In yet another arrangement, the electronic controller 300 does not decrease the speed of the uphill conveyor as a roll angle increases, but increases the speed of the downhill conveyor.

In all of these arrangements, the electronic controller 300 increases the difference in speed between the downhill conveyor and the uphill conveyor co as a function of the magnitude of the roll angle.

FIG. 5 illustrates the relationship between the speed of the uphill conveyor and the speed of the downhill conveyor as a function of the roll angle of the agricultural harvester 200. In particular, it illustrates the relationship between the C_uphill correction factor 502 and the C_downhill correction factor 500 determined in step 406 as a function of the roll angle.

In FIG. 5, the C_downhill and C_uphill correction factors vary with the roll angle R. As the roll angle increases (which is sensed in step 402), the C_downhill correction factor increases and the C_uphill correction factor decreases. The electronic controller 300 is configured to look up the value of the C_downhill and the C_uphill correction factors as a function of roll angle.

If the roll angle is less than $R_{min}$ (which, for typical harvesting head, is on the order of) 0.5-3°), the correction factors are equal to unity (1). By providing a "dead band" for small roll angles (e.g. the correction factor/s is equal 1), the electronic controller 300 is not constantly changing the speed of the conveyor belts, which could induce excessive wear in the belts and motors while providing little if any benefit to the crop distribution.

If the roll angle is greater than $R_{min}$, the two correction factors increase (in this case linearly) as a function of the roll angle until the roll angle reaches a maximum value ($R_{max}$), at which point neither of the two correction factors change. $R_{max}$ will typically vary between 5-30° depending upon the design of the harvesting head 204. Some harvesting heads are capable of operating on a very steep slope (i.e. a large roll angle) others are not.

The correction factor to roll angle relationships shown in FIG. 5 can be expressed in a variety of forms. They can be expressed as linear functions, stepwise linear functions, or higher-order functions based upon the type of crop being harvested, kinetics of the crop, and the construction details of the harvesting head 204 (e.g. details such as conveyor belt width, the existence of lugs on the belt, the base speed of the belt, the length of the belt, the size of the motor, etc.)

The particular function or functions by which they electronic controller 300 increases the difference in uphill/downhill conveyor speed with increasing roll angle are best determined empirically based upon these construction and crop details. However they are determined, the electronic controller 300 increases the difference in speed between the downhill conveyor and the uphill conveyor based upon the roll angle.

The electronic controller 300 may arithmetically calculate the correction factors based upon the roll angle. Alternatively, the calculations can be reduced or eliminated by providing a lookup table of roll angle versus correction factors (C_uphill, C_downhill) that the electronic controller 300 can access using a digital value of the roll angle (i.e. the signal from the roll sensor 302).

Having determined the correction factor in step 406, the electronic controller 300 then calculates the belt speed signal and transmits that belt speed signal to the motor controller 306. Electronic controller 300 multiplies the correction factors (C_uphill, C_downhill) by the speed command received from the operator in step 400. Additional compensation or scaling factors may be provided.

In one typical arrangement, the motor controller may further comprise a PWM (pulse width modulated) valve driver circuit configured to receive the belt speed signal from the electronic controller 300 and generate a corresponding electrical signal. This electrical signal is then applied to a coil that drives the hydraulic flow control valve of the motor controller 306, which in turn communicates hydraulic fluid to the right conveyor motors 310 and left conveyor motors 312.

Using the example relationship of FIG. 5, and at the maximum roll angle ($R_{max}$), the C_uphill would be 0.8, and the C_downhill would be 1.2. Thus, the downhill conveyor would be driven by the electronic controller 300 to operate at a speed that is 1.2 times the base speed commanded by the operator in step 400, and the uphill conveyor would be driven by the electronic controller 300 operated a speed that is 0.8 times the base speed commanded by the operator in step 400. The correction factor values of 0.8 and 1.2 are merely exemplary, however.

Depending upon details of construction of the harvesting head 204, the type of the crop being harvested, and the maximum angle at which the harvesting head 204 can operate, the correction factors can vary significantly from the specific numeric values shown in FIG. 5.

In the example of FIG. 5, there are two correction factors provided, and the speed of both the uphill conveyor and the downhill conveyor are changed as the roll angle of the harvesting head 204 changes.

It is not necessary that the speeds of both the conveyors 214, 218 change with changes in the roll angle, however.

In one arrangement, the electronic controller 300 both increases the speed of the downhill conveyor and decreases the speed of the uphill conveyor as the roll angle increases as shown in FIG. 5.

In an alternative arrangement, the electronic controller 300 does not increase the speed of the downhill conveyor as the roll angle increases, but instead decreases the speed of the uphill conveyor. In this arrangement, the electronic controller 300 is configured to use only the correction factor C_uphill to decrease the speed of the uphill conveyor as the roll angle increases and the electronic controller 300 does not employ the C_downhill correction factor.

In another arrangement, the electronic controller 300 does not decrease the speed of the uphill conveyor as a roll angle increases, but increases the speed of the downhill conveyor. In this arrangement, the electronic controller 300 is configured to use only the C_downhill correction factor to increase the speed of the downhill conveyor as the roll angle increases and the electronic controller 300 does not employ the C_uphill correction factor.

In all of these arrangements, however, the electronic controller 300 increases the difference in speed between the downhill conveyor and the uphill conveyor as the roll angle increases, and similarly decreases the difference in speed between the downhill conveyor and the uphill conveyor as the roll angle decreases.

The invention claimed is:

1. A control system (210) for an agricultural harvester (200) having an agricultural harvesting vehicle (202) and a harvesting head (204) mounted thereon, the harvesting head (204) further comprising a left side endless belt conveyor (214) driven by a left conveyor motor (312), a right side endless belt conveyor (218) driven by a right conveyor motor (310) and a center endless belt conveyor (220) driven by a center conveyor motor (314), the control system (210) comprising:
 an electronic controller (300) configured to receive an electronic signal indicative of a roll angle of the harvesting head (204), and to electronically change a speed of at least one of the right conveyor motor (310) and the left conveyor motor (312) relative to another of the right conveyor motor (310) and the left conveyor motor (312) based at least upon the electronic signal indicative of a roll angle of the harvesting head (204);
 wherein the electronic controller (300) is configured to change the speed of at least one of the right conveyor motor (310) and the left conveyor motor (312) relative to another of the right conveyor motor (310) and the left conveyor motor (312) in response to an increasing roll angle of the harvesting head (204) by (A) decreasing a speed of an uphill conveyor, (B) increasing a speed of a downhill conveyor, or (C) both decreasing the speed of the uphill conveyor and increasing the speed of the downhill conveyor; and
 wherein the electronic controller (300) is configured to electronically change the speed of at least one of the right conveyor motor (310) and the left conveyor motor (312) relative to another of the right conveyor motor (310) and the left conveyor motor (312) in response to a decreasing roll angle of the harvesting head (204) by (A) increasing a speed of the uphill conveyor, (B) decreasing the speed of a downhill conveyor, or (C) both increasing the speed of the uphill conveyor and decreasing the speed of the downhill conveyor.

2. The control system (210) of claim 1, further comprising a means for sensing (302) the roll angle of the harvesting head (204), and further wherein the means for sensing (302) is coupled to the electronic controller (300) to provide the electronic controller (300) with the electronic signal indicative of a roll angle of the harvesting head (204).

3. The control system (210) of claim 2, further comprising an operator input device (304) coupled to the electronic controller (300), wherein the operator input device (304) is configured to provide the electronic controller (300) with an electronic signal indicative of an operator-commanded conveyor speed, and further wherein the electronic controller (300) is configured to generate a conveyor speed signal based upon a combination of the operator-commanded conveyor speed and the electronic signal indicative of a roll angle of the harvesting head (204).

4. The control system (210) of claim 3, further comprising a means for controlling (306) a speed of the right conveyor motor (310) and a speed of the left conveyor motor (312), wherein the means for controlling (306) is configured to receive at least one conveyor speed command from the electronic controller (300) and to periodically and automatically modify the at least one conveyor speed command in accordance with the electronic signal indicative of a roll angle of the harvesting head (204).

5. The control system (210) of claim 2, wherein the means for sensing (302) includes at least one member selected from a group consisting of a pendulum sensor, an accelerometer, and a satellite navigation receiver.

6. The control system (210) of claim 4, wherein the means for controlling (306) includes at least one member selected from a group consisting of a hydraulic flow control valve and an electric motor driver circuit.

7. The control system (210) of claim 2, wherein the means for sensing (302) is mounted on the harvesting head (204).

8. The control system (210) of claim 2, wherein the agricultural harvester (200) comprises an agricultural harvesting vehicle (202) which supports the harvesting head (204) for movement through a field harvesting crops, and further wherein the means for sensing (302) is mounted on an agricultural harvesting vehicle (202).

9. An agricultural harvester (200) comprising:
an agricultural harvesting vehicle (202);
a harvesting head (204) mounted on the agricultural harvesting vehicle (202); and
a control system (210);
wherein the harvesting head (204) further comprises a left side endless belt conveyor (214) drivingly coupled to a left conveyor motor (312), a right side endless belt conveyor (218) drivingly coupled to a right conveyor motor (310) and a center endless belt conveyor (220) drivingly coupled to a center conveyor motor (314); and
wherein the control system (210) further comprises an electronic controller (300) configured to receive an electronic signal indicative of a roll angle of the harvesting head (204), and to electronically change a speed of at least one of the right conveyor motor (310) and the left conveyor motor (312) relative to another of the right conveyor motor (310) and the left conveyor motor (312) based at least upon the electronic signal indicative of a roll angle of the harvesting head (204).

10. The agricultural harvester (200) of claim 9, wherein the electronic controller (300) is configured to change the speed of at least one of the right conveyor motor (310) and the left conveyor motor (312) relative to another of the right conveyor motor (310) and the left conveyor motor (312) in response to an increasing roll angle of the harvesting head (204) by (A) decreasing a speed of an uphill conveyor, (B) increasing a speed of a downhill conveyor, or (C) both decreasing the speed of the uphill conveyor and increasing the speed of the downhill conveyor; and
wherein the electronic controller (300) is configured to electronically change the speed of at least one of the right conveyor motor (310) and the left conveyor motor (312) relative to another of the right conveyor motor (310) and the left conveyor motor (312) in response to a decreasing roll angle of the harvesting head (204) by (A) increasing a speed of the uphill conveyor, (B) decreasing the speed of a downhill conveyor, or (C) both increasing the speed of the uphill conveyor and decreasing the speed of the downhill conveyor.

* * * * *